(No Model.)

H. A. MOWREY.
HAY RACK.

No. 506,180. Patented Oct. 3, 1893.

WITNESSES:
Philip Cronin
M. V. Kane

INVENTOR
Harry Aaron Mowrey
BY
Simon M. Dorsey
HIS ATTORNEY.

UNITED STATES PATENT OFFICE.

HARVEY AAROM MOWREY, OF HOMESTEAD, KANSAS.

HAY-RACK.

SPECIFICATION forming part of Letters Patent No. 506,180, dated October 3, 1893.

Application filed October 1, 1892. Serial No. 447,562. (No model.)

*To all whom it may concern:*

Be it known that I, HARVEY AAROM MOWREY, a citizen of the United States, residing at Homestead, in the county of Chase and State of Kansas, have invented certain new and useful Improvements in Wind-Racks; and I do hereby declare the following to be a full, clear, and exact description of the invention, such as will enable others skilled in the art to which it appertains to make and use the same.

My invention relates to certain improvements in wind racks and it has for its object to provide a body whereby hay or unshocked corn may be securely carried upon wagons and which will also offer facilities for the unloading thereof and for these purposes it consists of the construction, arrangement and combination of the parts of which it is composed, as will be hereinafter more fully described and claimed.

Figure 1:
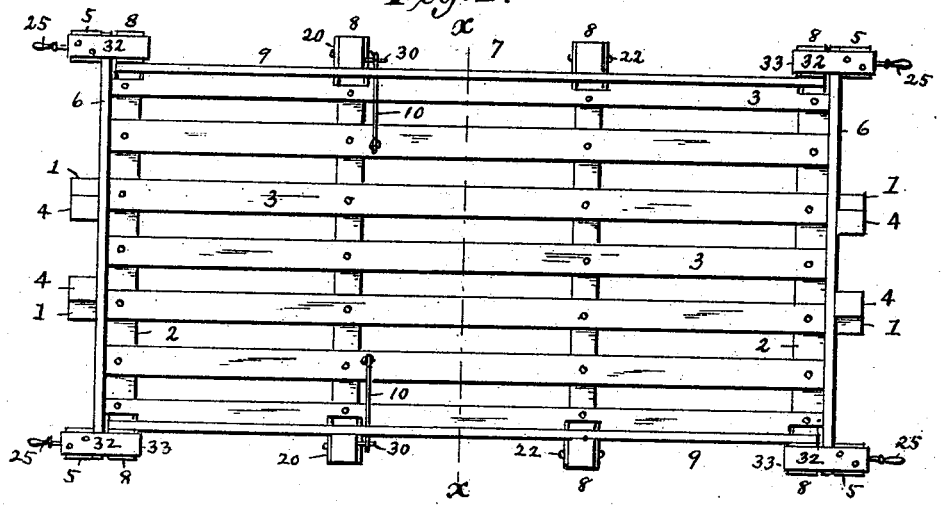
Figure 2:
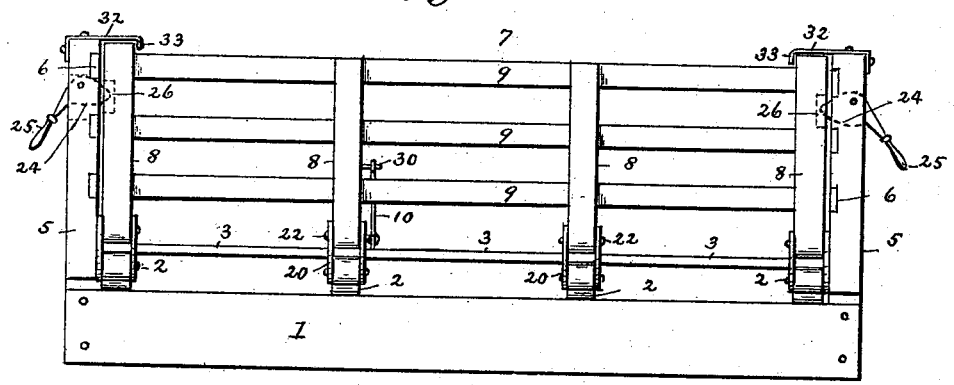
Figure 3:
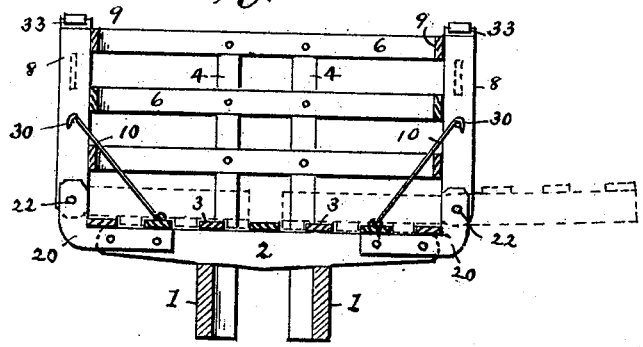

Referring to the accompanying drawings in which corresponding parts are designated by corresponding numerals:—Figure 1, is a plan view of my invention. Fig 2, is a side view thereof. Fig. 3, is a transverse section on line $x-x$ of Fig. 1.

The frame of the body consists of the longitudinal beams 1, at such a distance apart as to fit between the wheels of the vehicle, upon which the body may be mounted, and of sufficient length to rest upon the rear axle and the forward bolster of such wagon, the said beams being by preference at as great a distance apart as possible, in order to give greater stability to the frame. Cross bars 2, rest upon the top of the beams and project over the wheels of the vehicle, suitable longitudinal slats 3, being secured to the top of the said bars to form a bottom for the rack.

Uprights 4, are secured to each end of each of the beams 1, and uprights 5, are secured to the outer ends of the front and rear bars 2, while slats 6, are secured to the said posts forming a front and rear for the body.

The sides 7, are composed of the uprights 8, having slats 9, secured to their inner faces, the lower end of each of the said uprights being hinged to one of the corresponding cross-bars 2, the hinges by which these parts are connected being constructed as follows:—Plates 20 are rigidly secured to each side of the ends of each of the bars 2, the outer ends of the said straps being bent upwardly, through which, and through the lower end of the side upright 8, a pivot 22, passes. It will thus be seen, that the sides 7, are not only capable of folding inwardly upon the bottom of the rack when desired (for which purpose the slats 9, upon such sides, are located as to register with the spaces between the slats 3) but also to drop outwardly, as shown in dotted lines in Fig. 3, whereby the unloading, &c., is greatly facilitated.

To hold the sides 7, in their normally raised position, cam catches 24, provided with a handle 25, are pivoted within a vertical longitudinal slot 26, in the upper end of each of the corner posts 5, the said catches being adapted, when thrown inwardly, to enter recesses in the end posts 8, of the sides, thus locking the said sides in a vertical position, in which they are assisted by the hook-bars 10, pivoted to the bottom of the body, the free hooked ends of the said body being adapted to engage pins 30, upon the sides. The corner posts 5, and the end posts 8, of the sides project slightly above the level of the rest of the rack and the said corner posts 5, have upon their ends the horizontal plates 32, provided with the downwardly directed inner ends 33, which when the sides 7, are in their vertical position bind them and the ends together, thus preventing a dislocation of the latter by the pressure of the load. It will now be evident, that if the sides are raised, the rack will be adapted to haul hay, &c., while to haul corn, it is desirable that the sides be laid upon the bottom, as shown in dotted lines in Fig. 2.

Having thus described my invention, what I claim is—

In a wind rack, the combination with a bottom composed of transverse pieces and longitudinal slats laid thereon and separated from each other, of sides, consisting of uprights and slats secured to the inner sides thereof, plates secured to the opposite ends of the transverse pieces, and having their ends bent upwardly and projecting, pivot pins securing the said uprights to the said plates, whereby the sides are adapted to fold flat upon the bottom, the slats thereon being intermediate of each other, ends consisting of posts and transverse slats, the corner posts of the said ends, and corner uprights of the sides being slotted, a cam pivoted in the slots in end posts and taking into the slots in the uprights, and plates secured upon the tops of the corner posts and having downwardly projecting ends engaging the tops of the corner uprights of the sides, substantially as described.

In testimony whereof I affix my signature in presence of two witnesses.

HARVEY AAROM MOWREY.

Witnesses:
 LOUIS DUEHN,
 CLAY SHAFT.